United States Patent
Sugano

(10) Patent No.: US 9,245,508 B2
(45) Date of Patent: Jan. 26, 2016

(54) MUSIC PIECE ORDER DETERMINATION DEVICE, MUSIC PIECE ORDER DETERMINATION METHOD, AND MUSIC PIECE ORDER DETERMINATION PROGRAM

(71) Applicant: JVC KENWOOD CORPORATION, Yokohama-shi, Kanagawa (JP)

(72) Inventor: Masato Sugano, Yokosuka (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 14/540,144

(22) Filed: Nov. 13, 2014

(65) Prior Publication Data
US 2015/0068389 A1    Mar. 12, 2015

Related U.S. Application Data

(63) Continuation of application No. PCT/JP2013/058279, filed on Mar. 22, 2013.

(30) Foreign Application Priority Data

May 30, 2012    (JP) .................................. 2012-122812

(51) Int. Cl.
*G10H 7/00* (2006.01)
*G10H 1/40* (2006.01)
*G06F 17/30* (2006.01)

(52) U.S. Cl.
CPC ............ *G10H 1/40* (2013.01); *G06F 17/30772* (2013.01); *G10H 2210/125* (2013.01);
(Continued)

(58) Field of Classification Search
CPC .............. G10H 1/40; G10H 2220/086; G10H 2240/141; G10H 2210/125; G10H 2240/325; G10H 2250/035; G06F 17/30775
USPC ...................................... 84/612, 636
See application file for complete search history.

(56) References Cited

U.S. PATENT DOCUMENTS 6,344,607 B2 *   2/2002   Cliff ............................... 84/611
7,855,334 B2    12/2010   Yamashita et al.
(Continued)

FOREIGN PATENT DOCUMENTS

JP    2002-6839 A      1/2002
JP    2003-330460 A    11/2003
(Continued)

*Primary Examiner* — Jeffrey Donels
(74) *Attorney, Agent, or Firm* — Nath, Goldberg & Meyer; Jerald L. Meyer

(57) ABSTRACT

A beat information corrector acquires beat position information including information regarding a point of time when a beat is reproduced, acquires a tempo value indicating a number of beats per unit time in a music piece, and corrects the beat position information of the music piece so that the tempo value of the music piece be a same value as the reference value. A correlation value calculator calculates a correlation value, which indicates a degree of correlation of beat position information between respective music pieces among a plurality of the music pieces, based on the corrected beat position information. A music piece order determiner determines a music piece order as a reproduction order of music pieces, which are to be reproduced successively, so that a product or total sum of the correlation values between the music pieces be at a maximum or an approximate solution thereof.

18 Claims, 9 Drawing Sheets

| SUBSEQUENT MUSIC PIECE \ PREVIOUS MUSIC PIECE | MUSIC PIECE A | MUSIC PIECE B | MUSIC PIECE C | MUSIC PIECE D | MUSIC PIECE E |
|---|---|---|---|---|---|
| MUSIC PIECE A |  | 0.14 | 0.39 | 0.29 | 0.40 |
| MUSIC PIECE B | 0.23 |  | 0.28 | 0.04 | 0.12 |
| MUSIC PIECE C | 0.12 | 0.23 |  | 0.28 | 0.33 |
| MUSIC PIECE D | 0.28 | 0.55 | 0.21 |  | 0.15 |
| MUSIC PIECE E | 0.37 | 0.08 | 0.12 | 0.39 |  |

500

(52) U.S. Cl.
CPC .... *G10H2220/086* (2013.01); *G10H 2240/141* (2013.01); *G10H 2240/325* (2013.01); *G10H 2250/035* (2013.01)

(56) References Cited

U.S. PATENT DOCUMENTS

| | | | |
|---|---|---|---|
| 8,269,093 B2* | 9/2012 | Naik et al. | 84/612 |
| 2002/0005110 A1 | 1/2002 | Pachet et al. | |
| 2003/0205124 A1 | 11/2003 | Foote et al. | |
| 2006/0000344 A1* | 1/2006 | Basu | 84/612 |
| 2008/0115658 A1* | 5/2008 | Fujishima et al. | 84/618 |
| 2010/0162115 A1* | 6/2010 | Ringewald et al. | 715/716 |
| 2013/0263720 A1* | 10/2013 | Sugano | 84/612 |

FOREIGN PATENT DOCUMENTS

| | | |
|---|---|---|
| JP | 2005-227850 A | 8/2005 |
| JP | 2008-216486 A | 9/2008 |
| JP | 2008-233812 A | 10/2008 |
| JP | 2012-123120 A | 6/2012 |
| WO | 2007/066818 A1 | 6/2007 |

\* cited by examiner

FIG. 4A
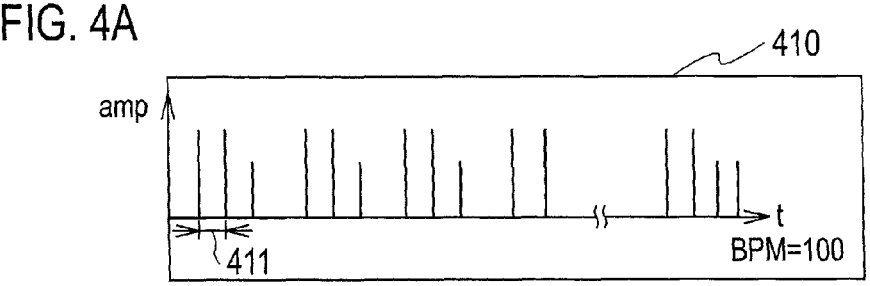
FIG. 4B
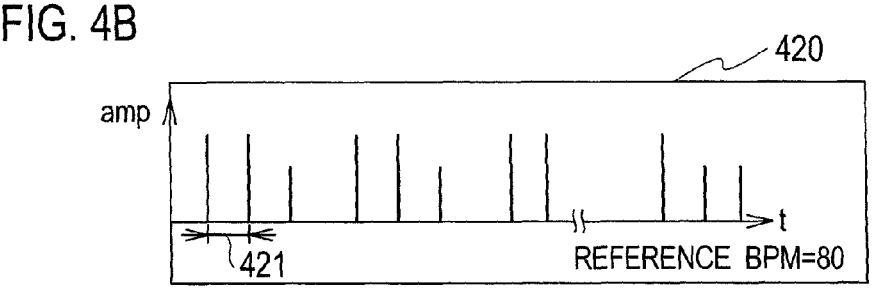
FIG. 5
| SUBSEQUENT MUSIC PIECE \ PREVIOUS MUSIC PIECE | MUSIC PIECE A | MUSIC PIECE B | MUSIC PIECE C | MUSIC PIECE D | MUSIC PIECE E |
|---|---|---|---|---|---|
| MUSIC PIECE A |  | 0.14 | 0.39 | 0.29 | 0.40 |
| MUSIC PIECE B | 0.23 |  | 0.28 | 0.04 | 0.12 |
| MUSIC PIECE C | 0.12 | 0.23 |  | 0.28 | 0.33 |
| MUSIC PIECE D | 0.28 | 0.55 | 0.21 |  | 0.15 |
| MUSIC PIECE E | 0.37 | 0.08 | 0.12 | 0.39 |  |

FIG. 6A
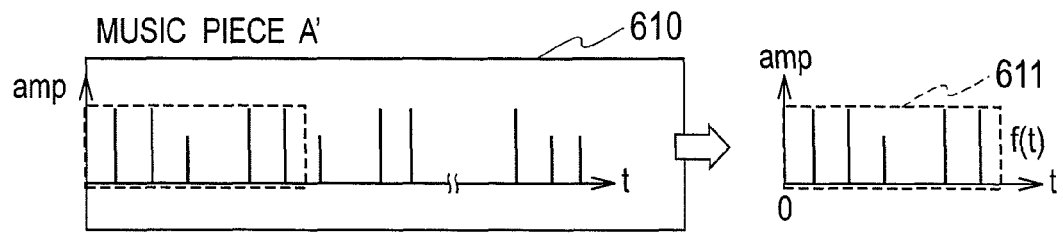
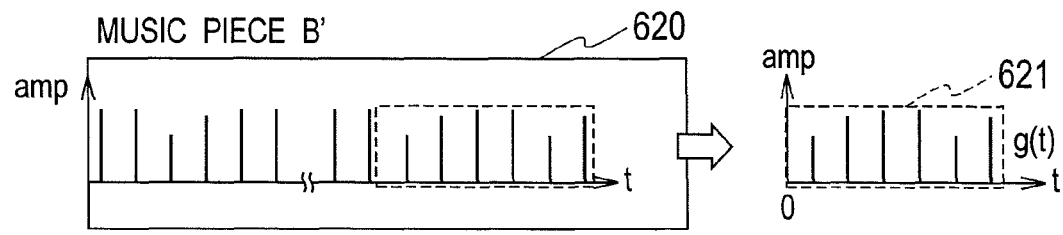
FIG. 6B
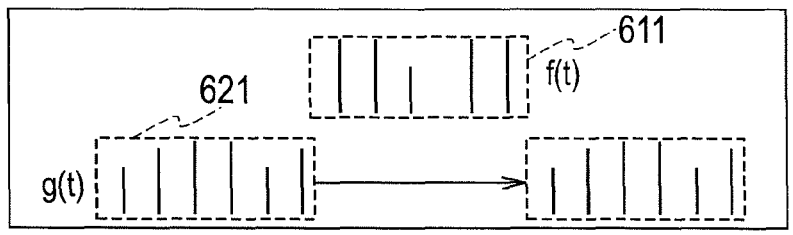
FIG. 7
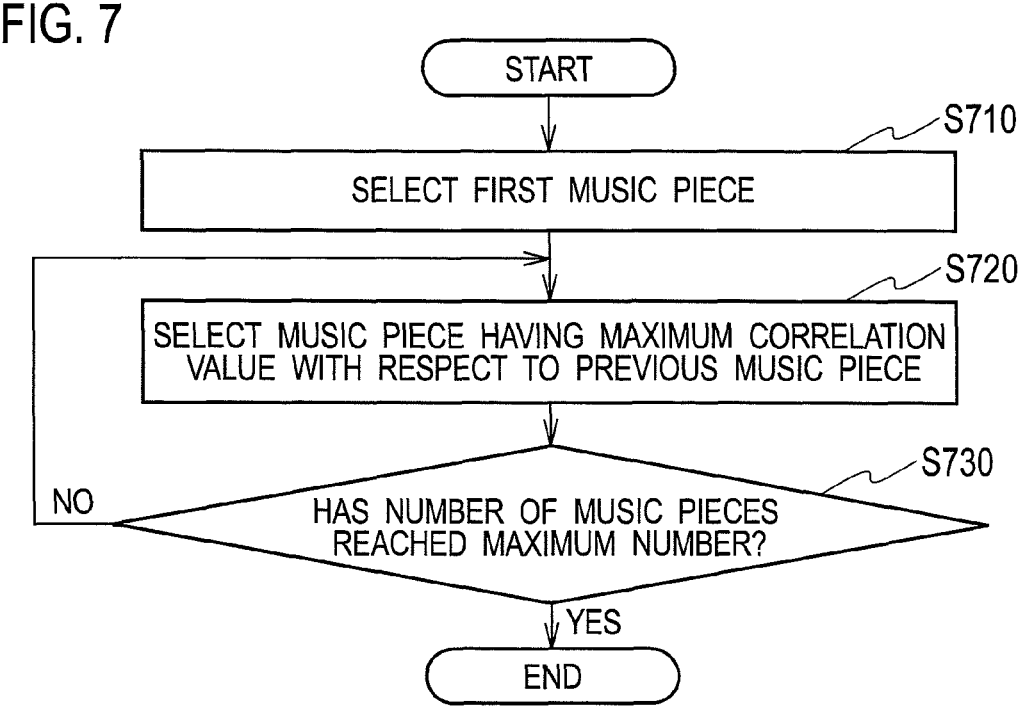

FIG. 11

| COMBINATION | ADDED MUSIC PIECE | STORED MUSIC PIECE |
|---|---|---|
| K1 | BASS DRUM BEAT | BASS DRUM BEAT |
| K2 | BASS DRUM BEAT | SNARE DRUM BEAT |
| K3 | BASS DRUM BEAT | FULL BEAT |
| K4 | BASS DRUM BEAT | BASS DRUM REST |
| K5 | BASS DRUM BEAT | SNARE DRUM REST |
| K6 | BASS DRUM BEAT | FULL REST |
| K7 | SNARE DRUM BEAT | BASS DRUM BEAT |
| K8 | SNARE DRUM BEAT | SNARE DRUM BEAT |
| K9 | SNARE DRUM BEAT | FULL BEAT |
| K10 | SNARE DRUM BEAT | BASS DRUM REST |
| K11 | SNARE DRUM BEAT | SNARE DRUM REST |
| K12 | SNARE DRUM BEAT | FULL REST |
| K13 | FULL BEAT | BASS DRUM BEAT |
| K14 | FULL BEAT | SNARE DRUM BEAT |
| K15 | FULL BEAT | FULL BEAT |
| K16 | FULL BEAT | BASS DRUM REST |
| K17 | FULL BEAT | SNARE DRUM REST |
| K18 | FULL BEAT | FULL REST |
| K19 | BASS DRUM REST | BASS DRUM BEAT |
| K20 | BASS DRUM REST | SNARE DRUM BEAT |
| K21 | BASS DRUM REST | FULL BEAT |
| K22 | BASS DRUM REST | BASS DRUM REST |
| K23 | BASS DRUM REST | SNARE DRUM REST |
| K24 | BASS DRUM REST | FULL REST |
| K25 | SNARE DRUM REST | BASS DRUM BEAT |
| K26 | SNARE DRUM REST | SNARE DRUM BEAT |
| K27 | SNARE DRUM REST | FULL BEAT |
| K28 | SNARE DRUM REST | BASS DRUM REST |
| K29 | SNARE DRUM REST | SNARE DRUM REST |
| K30 | SNARE DRUM REST | FULL REST |
| K31 | FULL REST | BASS DRUM BEAT |
| K32 | FULL REST | SNARE DRUM BEAT |
| K33 | FULL REST | FULL BEAT |
| K34 | FULL REST | BASS DRUM REST |
| K35 | FULL REST | SNARE DRUM REST |
| K36 | FULL REST | FULL REST |

FIG. 12 1200

| SUBSEQUENT MUSIC PIECE \ PREVIOUS MUSIC PIECE | MUSIC PIECE A | MUSIC PIECE C | MUSIC PIECE D | MUSIC PIECE E |
|---|---|---|---|---|
| MUSIC PIECE A |  | 0.37 | 0.32 | 0.51 |
| MUSIC PIECE C | 0.77 |  | 0.38 | 0.09 |
| MUSIC PIECE D | 0.11 | 0.11 |  | 0.40 |
| MUSIC PIECE E | 0.12 | 0.52 | 0.30 |  |

FIG. 13 1300

| SUBSEQUENT MUSIC PIECE \ PREVIOUS MUSIC PIECE | MUSIC PIECE A | MUSIC PIECE B | MUSIC PIECE C | MUSIC PIECE E |
|---|---|---|---|---|
| MUSIC PIECE A |  | 0.30 | 0.12 | 0.87 |
| MUSIC PIECE B | 0.35 |  | 0.27 | 0.12 |
| MUSIC PIECE C | 0.36 | 0.34 |  | 0.01 |
| MUSIC PIECE E | 0.29 | 0.36 | 0.61 |  |

US 9,245,508 B2

MUSIC PIECE ORDER DETERMINATION DEVICE, MUSIC PIECE ORDER DETERMINATION METHOD, AND MUSIC PIECE ORDER DETERMINATION PROGRAM

CROSS REFERENCE TO RELATED APPLICATION

This application is a Continuation of PCT Application No. PCT/JP2013/058279, filed on Mar. 22, 2013, and claims the priority of Japanese Patent Application No. 2012-122812, filed on May 30, 2012, the entire contents of all of which are incorporated herein by reference.

BACKGROUND

The present disclosure relates to a music piece order determination device, a music piece order determination method and a music piece order determination program for determining an order of reproducing music pieces.

As one of methods for expressing music, a method called mix reproduction is known. The mix reproduction is a method of not simply reproducing music pieces one by one sequentially from start to end but continuously reproducing the successive music pieces without any interruption while adjusting a reproduction speed of the music pieces, applying effects such as delay and reverb to the music pieces, or inserting sound effects such as scratch.

International Publication WO 2007/066818 (Patent Document 1) discloses a technology for automatically performing the mix reproduction of the music pieces by selecting an appropriate mixing method for the successive music pieces by using metadata in which beats and melody structures of the music pieces are described.

SUMMARY

However, even though the mix reproduction is performed by using the technology of Patent Document 1, connection between the successive music pieces sometimes sounds unnatural to the listener in a case where the successive music pieces are not compatible with the mix reproduction. The technology of Patent Document 1 was not able to determine a reproduction order (music piece order), which is suitable for the mix reproduction, in consideration of such compatibility between the music pieces.

It is an object of the embodiments to provide a music piece order determination device, a music piece order determination method and a music piece order determination program, which are capable of determining a music piece order suitable for the mix reproduction.

A first aspect of the embodiments provides a music piece order determination device comprising: a beat information corrector configured, in a case of reproducing a music piece, to acquire beat position information including at least information regarding a point of time when a beat is reproduced, to acquire a tempo value indicating a number of beats per unit time in the music piece, and to correct, in a case where the tempo value is different from a reference value, the beat position information of the music piece so that the tempo value of the music piece be a same value as the reference value; a correlation value calculator configured to calculate a correlation value based on the beat position information in which the tempo value is corrected to the same value as the reference value, the correlation value indicating a degree of correlation of beat position information between respective music pieces among a plurality of the music pieces; and a music piece order determiner configured to determine a music piece order as a reproduction order of music pieces, the music pieces being reproduced successively, so that a product or total sum of the correlation values between the music pieces be at a maximum or an approximate solution thereof.

A second aspect of the embodiments provides a music piece order determination method comprising the steps of: acquiring beat position information including at least information regarding a point of time when a beat is reproduced in a case of reproducing a music piece, acquiring a tempo value indicating a number of beats per unit time in the music piece, and correcting, in a case where the tempo value is different from a reference value, the beat position information of the music piece so that the tempo value of the music piece be a same value as the reference value; calculating a correlation value based on the beat position information in which the tempo value is corrected to the same value as the reference value, the correlation value indicating a degree of correlation of beat position information between respective music pieces among a plurality of the music pieces; and determining a music piece order as a reproduction order of music pieces, the music pieces being reproduced successively, so that a product or total sum of the correlation values between the music pieces be at a maximum or an approximate solution thereof.

A third aspect of the embodiments provides a computer program product stored in a non-transitory computer readable medium for causing a computer to perform the steps of: acquiring beat position information including at least information regarding a point of time when a beat is reproduced in a case of reproducing a music piece, acquiring a tempo value indicating a number of beats per unit time in the music piece, and correcting, in a case where the tempo value is different from a reference value, the beat position information of the music piece so that the tempo value of the music piece be a same value as the reference value; calculating a correlation value based on the beat position information in which the tempo value is corrected to the same value as the reference value, the correlation value indicating a degree of correlation of beat position information between respective music pieces among a plurality of the music pieces; and determining a music piece order as a reproduction order of music pieces, the music pieces being reproduced successively, so that a product or total sum of the correlation values between the music pieces be at a maximum or an approximate solution thereof.

BRIEF DESCRIPTION OF THE DRAWINGS

FIG. 4A is a diagram showing beat position information before being corrected.

FIG. 4B is a diagram showing beat position information after being corrected.

FIG. 5 is a diagram showing an example of a correlation value table in the first embodiment.

FIG. 6A is a diagram showing beat position information of a beginning portion of one music piece and beat position information of an ending portion of another music piece.

FIG. 6B is a diagram for explaining a method for calculating a correlation value.

FIG. 7 is a flowchart of music piece order determination processing in the first embodiment.

FIG. 11 is a table for explaining combinations of information for calculating correlation values in the second embodiment.

FIG. 12 is a diagram showing an example of a correlation value table in the second embodiment.

FIG. 13 is a diagram showing another example of the correlation value table in the second embodiment.

DETAILED DESCRIPTION

Figure 1:
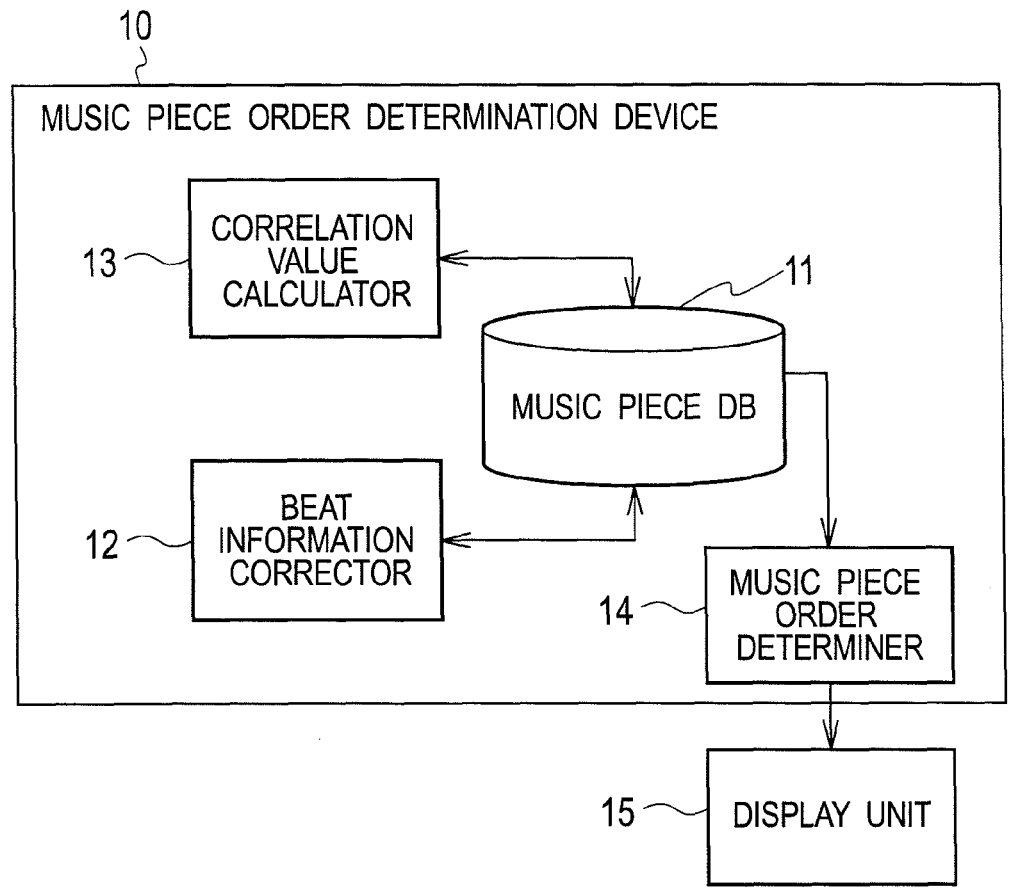
FIG. 1 is a block diagram showing a configuration of a music piece order determination device according to a first embodiment.

A description is made below of the respective embodiments with reference to the drawings. The same or similar reference numerals are assigned to the same or similar regions and constituents throughout the respective drawings, and a description thereof is omitted or simplified.

First Embodiment

FIG. 1 is a block diagram showing a configuration of a music piece order determination device according to a first embodiment. As shown in FIG. 1, the music piece order determination device 10 according to the first embodiment includes: a music piece DB (database) 11; a beat information corrector 12; a correlation value calculator 13; and a music piece order determiner 14. The music piece order determination device 10 is connected to a display unit 15.

The music piece DB 11 stores music piece data of a plurality of music pieces, beat information metadata as metadata of the respective music pieces, a correlation value table (refer to FIG. 5 to be described later) that stores correlation values between the music pieces in a table format, and the like. The music piece DB 11 is composed of a storage device such as an HDD and a memory. Note that the music piece DB 11 may be a fixed storage device, an attachable/detachable storage device, or an external storage device connected through a cable or a network.

The beat information metadata includes: beat position information including information regarding positions of beats on a time axis of each of the music pieces and information regarding amplitudes of the beats; and a tempo value indicating a tempo of the music piece. For example, the tempo value is represented by a BPM (Beats Per Minute). The BPM is a value indicating the number of beats (the number of quarter notes in general) per minute (unit time) of the music piece.

Note that, in the beat position information, the information regarding the amplitudes of the beats does not have to be necessarily included, and for example, all of the amplitudes may be set at the same value (for example, 1). However, the beat position information is allowed to include the information regarding the amplitudes of the beats, whereby each of the correlation values to be described later in detail can be calculated more accurately when calculating the same.

Moreover, each of the positions of the beats on the time axis is information indicating a time when the beat is reproduced when the music is reproduced. For example, a reproduction start time in an event where the music piece data is reproduced from the start thereof is taken as a reference, and the beat position information is indicated by a time elapsed from the reproduction start time. Note that it is not necessarily necessary for the beat position information to take the reproduction start time as a reference, and the beat position information may take, as a reference, an arbitrary time when the music piece data is reproduced.

Figure 2A:
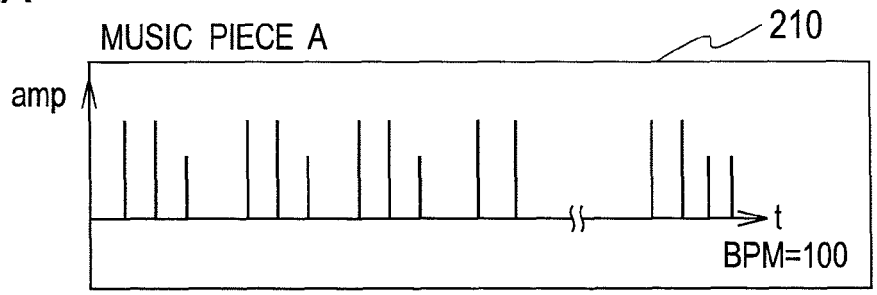
FIG. 2A is a diagram showing an example of beat position information.
Figure 2B:
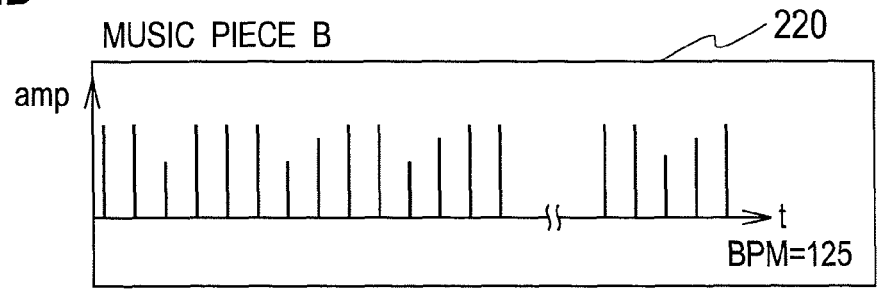
FIG. 2B is a diagram showing another example of the beat position information.

FIGS. 2A and 2B are diagrams for explaining the beat position information. FIGS. 2A and 2B show examples of beat position information of music pieces A and B, respectively. In each of FIGS. 2A and 2B, an axis of abscissas represents a time t, and an axis of ordinates represents amplitudes amp of beats.

Each position of the beats on the time axis is a sound emitting position of a sound (sound that determines rhythm of each music piece) of a percussion instrument that composes each music piece. The type of the percussion instrument is arbitrary. Moreover, in a case of a music piece that does not include the sound of the percussion instrument, then the position of the beat represents a sound emitting position of an instrument that forms the beat. Note that, as shown in FIG. 2A and FIG. 2B, a BPM of a music piece A is 100, and a BPM of a music piece B is 125.

In the music piece order determination device 10, the beat position information on the time axis of each music piece and the BPM are stored as the beat information metadata in the music piece DB 11; however, a method for acquiring the beat information metadata is not limited to this. For example, a user may input the beat position information and the BPM in advance.

Beat information metadata may be automatically detected from a waveform of the music piece by using the beat detection method described in Japanese Patent Application Laid-Open Publication No. 2008-233812, or the like, and the detected beat information metadata may be used herein.

The beat information corrector 12 acquires the beat position information and BPM of each music piece from the music piece DB 11, corrects a position of a beat in the beat position information of a music piece in which a BPM is different from a reference BPM as a predetermined reference value, and allows the BPM of each music piece to coincide with the reference BPM (unifies the BPMs).

The beat information corrector 12 stores the corrected beat position information and BPM in the music piece DB 11. Note that a description will be made in detail of operations of the beat information corrector 12. Note that the reference BPM may be determined in advance, or a BPM of a predetermined music piece may be used as the reference BPM.

The correlation value calculator 13 calculates the correlation value, which indicates a degree of correlation in the beat position information between the respective music pieces among a plurality of the music pieces stored in the music piece DB 11, based on the beat position information of the respective music pieces in which the BPMs are unified. Note that, in this embodiment, as an example, it is defined that pieces of the beat position information have a stronger correlation as the correlation value is larger.

The correlation value calculator 13 stores the calculated correlation value as the beat information metadata of each music piece in the music piece DB 11.

Furthermore, the correlation value calculator 13 normalizes such correlation values between the respective music pieces, which are stored in the music piece DB 11, and stores the normalized correlation values as a correlation value table in the music piece DB 11. Note that processing for normalizing the correlation values is not essential.

The music piece order determiner 14 acquires such a normalized correlation value from the correlation value table stored in the music piece DB 11, and determines a music piece order, which is a reproduction order of a predetermined number of the music pieces, based on the acquired correlation value, the music pieces being reproduced from the music piece DB 11.

The display unit 15 is composed of a display or a monitor, and displays the music piece order determined by the music piece order determiner 14.

Next, a description is made of operations of the music piece order determination device 10.

Figure 3:
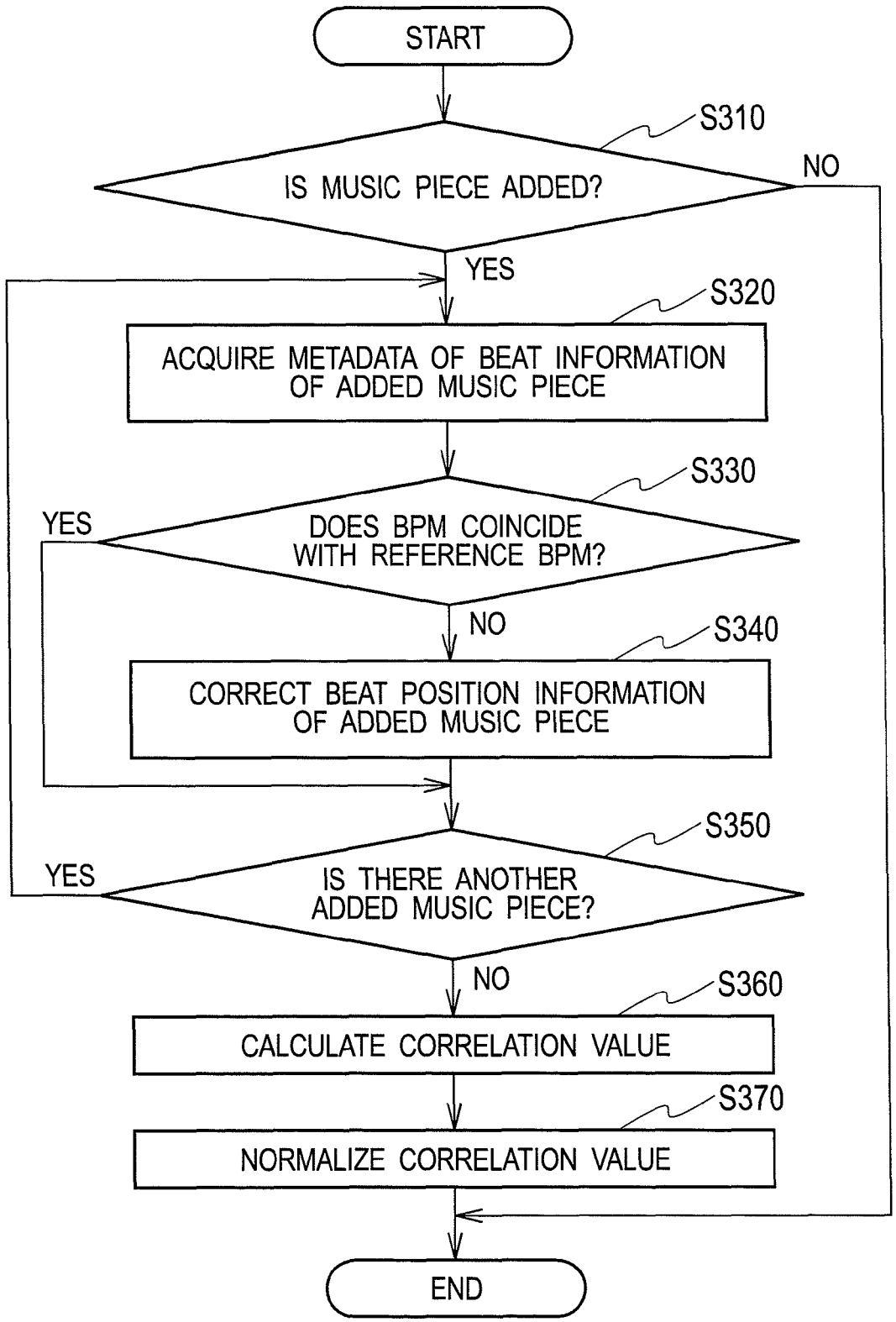
FIG. 3 is a flowchart for explaining operations of the music piece order determination device according to the first embodiment at a time of adding a music piece to a music piece DB.

Every time when the music piece is added to the music piece DB 11, the music piece order determination device 10 calculates the correlation value, and so on. FIG. 3 is a flowchart for explaining the operations of the music piece order determination device 10 at the time of adding the music piece to the music piece DB 11.

First, as shown in FIG. 3, the beat information corrector 12 determines whether or not the music piece is newly added to the music piece DB 11 (Step S310), and ends the processing if the music piece is not newly added ("NO" in Step S310).

In a case where a new music piece is added to the music piece DB 11 ("Yes" in Step S310), the beat information corrector 12 acquires beat information metadata of the added music piece from the music piece DB 11 (Step S320).

Next, the beat information corrector 12 determines whether or not a BPM of the added music piece, which is included in the acquired beat information metadata, coincides with the reference BPM (Step S330). In a case where the BPM of the added music piece coincides with the reference BPM ("Yes" in Step S330), then a procedure of the operations proceeds to Step S350.

In a case where the BPM of the added music piece does not coincide with the reference BPM ("No" in Step S330), the beat information corrector 12 corrects positions of beats in the beat position information of the added music piece, and allows the BPM of the music piece to coincide with the reference BPM (Step S340). The beat information corrector 12 stores the beat position information and the BPM, which are thus corrected, in the music piece DB 11. Thereafter, the procedure proceeds to Step S350.

Here, a description is made of a specific example of a correction method of the beat position information in Step S340 in FIG. 3.

In a case of performing mix reproduction for two music pieces, it frequently reproduces the two music pieces while matching values of such BPM information thereof with each other so that beats thereof can be heard overlapping each other satisfactorily. Therefore, in the music piece order determination device 10, the BPM of each music piece is unified to the reference BPM before the correlation value is obtained.

That is to say, in a case where the music piece is added to the music piece DB 11, the beat information corrector 12 corrects the positions of the beats so that the BPMs of all of the other music pieces stored in the music piece DB 11 can be unified to the reference BPM before calculating correlation values between the beat position information of the added music piece and the beat position information of all of the other music pieces.

Here, the reference BPM is a BPM used for the purpose of calculating the correlation value, and the music piece does not necessarily have to be reproduced according to the reference BPM at the time of such reproduction. The same applies to other embodiments.

Specifically, in a case where "Tb" is the reference BPM, and "T" is a BPM of a music piece to be subjected to such correction, then the beat information corrector 12 extends a beat interval in a time series of the music piece, which is to be subjected to the correction, by T/Tb times the reference BPM, and thereby allows the BPM of the music piece concerned to coincide with the reference BPM.

FIGS. 4A and 4B are diagrams showing the correction method of the beat position information by the beat information corrector 12. For example, it is assumed that the beat position information 410 shown in FIG. 4A is the beat position information of the added music piece. The BPM of this music piece is 100.

As opposed to this, in a case where the reference BPM is 80, the beat information corrector 12 corrects such beat positions so as to extend a beat interval in the beat position information 410 of FIG. 4A to a beat interval 5/4 (=100/80) times of an original beat interval. FIG. 4B shows the corrected beat position information 420.

For example, the beat information corrector 12 extends a beat interval in FIG. 4A to 5/4 times by inserting "0" thereinto. In this way, a beat interval 421 in FIG. 4B, which corresponds to the beat interval 411 in FIG. 4A, becomes 5/4 times of the beat interval 411. As a result, a BPM in the corrected beat position information 420 becomes 80 which is the reference BPM.

Returning to FIG. 3, in Step S350, the beat information corrector 12 determines whether or not there is another added music piece. In a case where the beat information corrector 12 determines that there is another added music piece ("Yes" in Step S350), the procedure proceeds to Step S320. In a case where the beat information corrector 12 determines that there is no added music piece ("No" in step S350), the procedure proceeds to processing in Step S360 that follows.

In Step S360, the correlation value calculator 13 calculates the correlation values between the added music piece and the music pieces other than the same. Specifically, the correlation value calculator 13 calculates correlation values between beat position information of an ending portion of the added music piece and beat position information of beginning portions of the music pieces other than the same. The correlation value calculator 13 stores the calculated correlation values as the beat information metadata of the added music piece.

Moreover, the correlation value calculator 13 also calculates correlation values between beat position information of a beginning portion of the added music piece and beat position information of ending portions of the music pieces other than the same, and individually stores the calculated correlation values as the beat information metadata of the music pieces other than the added music piece in the music piece DB 11. Note that another description is made of this processing in Step S360 by using FIG. 5.

In Step S370 that follows, the correlation value calculator 13 reads the correlation values of the respective music pieces from the music piece DB 11, and normalizes the read correlation values so that a sum of the correlation values of the added music piece and of the music pieces other than the same can become 1. In the music piece DB 11, the correlation value calculator 13 stores the normalized correlation values as a correlation value table as shown in FIG. 5.

FIG. 5 is a diagram showing an example of the correlation value table. In the correlation value table 500 shown in FIG.

5, for example, correlation values in cases where the respective music pieces A to E become previous and subsequent music pieces are normalized so that a sum of the correlation values in each of the columns can become 1. That is to say, in the correlation value table 500, the sum of the correlation values of the music pieces A to E in each of the columns is 1, and each of the correlation values can be used as a transition probability to the music piece other than the music piece concerned.

Here, in the correlation value table 500 shown in FIG. 5, for example, in a case where the music piece E is the added music piece, the music pieces other than the same are the music pieces A to D. In this case, in Step S360, first, the correlation value calculator 13 obtains correlation values in a case where the music piece E is a previous music piece and the music pieces A to D are subsequent music pieces, that is, correlation values between the beat position information of the ending portion of the music piece E and the beat position information of the beginning portions of the music pieces A to D other than the same.

That is to say, as shown in the correlation value table 500 shown in FIG. 5, the correlation value calculator 13 calculates unnormalized values, which are 0.40, 0.12, 0.33 and 0.15, as the correlation values in such a case where the music piece E is the previous music and the music pieces A to D other than the same are the subsequent music pieces, respectively, and stores the unnormalized values as the beat information metadata of the music piece E in the music piece DB 11.

Meanwhile, in Step S360, the correlation value calculator 13 further obtains correlation values in a case where the music pieces A to D are the previous music pieces and the music piece E is the subsequent music piece, that is, correlation values between the beat position information of the beginning portion of the music piece E and the beat position information of the ending portions of the music pieces A to D other than the same.

That is to say, as shown in the correlation value table 500 shown in FIG. 5, the correlation value calculator 13 calculates unnormalized values, which are 0.37, 0.08, 0.12 and 0.39, as the correlation values between the beat position information of the beginning portion of the music piece E and the beat position information of the ending portions of the music pieces A to D other than the same, respectively, and stores the unnormalized values as the beat information metadata of the music pieces A to D in the music piece DB 11.

As described above, in Step S360, the correlation value calculator 13 calculates the correlation value every time when the music piece is newly added, and stores the calculated correlation value in the music piece DB 11, and accordingly, in Step S370, the correlation value calculator 13 normalizes the correlation value newly calculated in Step S360 and the existing correlation values one more time in combination with each other every time when the music piece is newly added, and stores the normalized correlation values as the correlation value table 500. Then, the procedure is ended.

For example, in a case where a music piece F is newly added, then in the correlation value table 500, the correlation value calculator 13 normalizes the correlation values one more time so that a sum of the correlation values of the music pieces A to F in each of the columns, in each of which such a new music piece F is added to each of the columns of the music pieces A to E, can become 1, and then stores the normalized correlation values as the correlation value table 500. Note that, here, the correlation value calculator 13 stores only the normalized correlation values as the correlation value table 500; however, may also store the unnormalized correlation values as another correlation value table.

Next, a description is made of a calculation method of the correlation values in Step S360 of FIG. 3.

Beat position information 610 of a music piece A' and beat position information 620 of a music piece B', which are shown in FIG. 6A, are beat position information after the BPMs are unified to the reference BPM. A description is made of, as an example, a case of calculating a degree of correlation between beat position information 611 on a beginning portion of the music piece A' and a beat position information 621 on an ending portion of the music piece B'.

First, as shown in FIG. 6A, the correlation value calculator 13 defines that the beat position information 611 on the beginning portion, which is extracted from the beat position information 610 of the music piece A', is a function f(t). In a similar way, the correlation value calculator 13 defines that the beat position information 621 on the ending portion, which is extracted from the beat position information 620 of the music piece B', is a function g(t).

Note that a range from which the beat position information is to be extracted may be determined by a fixed time length from the beginning or ending portion of the music piece or from a position where the beat is present, or alternatively, may be obtained as a ratio from a time length of the music piece. For example, in the latter case, if the beat position information is extracted by the amount of 5% of the whole of the music piece, then the beat position information is extracted by the length of 15 seconds from a music piece with a time length of five minutes.

Next, as shown in FIG. 6B, while translating the function g(t), which shows the beat position information 621 on the ending portion of the music piece B', in a direction of the time axis t, the correlation value calculator 13 obtains each of total sums of products of f(t) and g(t), that is, $\Sigma n(f(n) \cdot g(n-m))$ at each position (time) thus translated.

That is to say, the correlation value calculator 13 changes m in a range where f(t) and g(t) overlap each other, and obtains $\Sigma n(f(n) \cdot g(n-m))$ at each value of m. Then, the correlation value calculator 13 defines, as a correlation value, a maximum value of the total sums $\Sigma n(f(n) \cdot g(n-m))$ of the products of f(t) and g(t), which are thus obtained.

Therefore, for example, the correlation value calculator 13 stores, as an array for each of the arbitrary time intervals, the function f(t) indicating the beat position information 611 on the beginning portion of the music piece A' and the function g(t) indicating the beat position information 621 on the ending portion of the music piece B'. That is to say, a value (amplitude) of the beat is arranged in an array element corresponding to a point of time when the beat is present, and 0 is arranged in an array element corresponding to a point of time when the beat is not present.

$\Sigma n(f(n) \cdot g(n-m))$ that is each of the total sums of the products of f(t) and g(t), in each of which m is changed in the range where f(t) and g(t) overlap each other, becomes the total sums of the products of the respective corresponding elements of the arrays applying to f(t) and g(t). Here, obtaining the total sums of the products while changing m in the range where f(t) and g(t) overlap each other corresponds to obtaining total sums of products of shifted array elements as a result of shifting the array elements by the amount of m pieces in the range where the above-described arrays overlap each other and of the corresponding array elements of the other array.

As described above, the correlation value calculator 13 calculates, as the correlation value, the maximum value of the respective total sums $\Sigma n(f(n) \cdot g(n-m))$ obtained by shifting m in the range where f(t) and g(t) overlap each other.

Next, a description is made of music piece order determination processing in the music piece order determination device 10.

The music piece order determiner 14 determines a music piece order of a predetermined number of the music pieces, which are to be reproduced from the music piece DB 11, so that the product or total sum of the correlation values between the music pieces to be successively reproduced, can become the maximum value. For example, the music piece order determiner 14 selects the predetermined number of music pieces from the music piece DB 11 randomly or according to user's designation. Then, the music piece order determiner 14 determines the music piece order of the selected music pieces so that the product or total sum of the correlation values between the music pieces to be successively reproduced can become the maximum value.

The music piece order is determined so that the product or total sum of the correlation values can be the maximum value as described above, whereby an optimum music piece order can be determined accurately. However, this method requires a large amount of computation, and an existing computer requires a long time for computational processing. A reason for this is as follows. If n is the number of music pieces for which the music piece order is to be determined, then music piece transition patterns are nPn ways. Accordingly, in order to obtain such a music piece transition pattern with which the product or sum of the correlation values becomes the maximum value, an amount of computation in the order of n! is required.

In this connection, a description is made below of processing for determining the music piece order with a small amount of computation. FIG. 7 is a flowchart of this music piece order determination processing.

Here, a description is made of, as an example, a case of determining a music piece order of five music pieces, which are the music pieces A to E shown in the correlation value table 500 of FIG. 5.

First, the music piece order determiner 14 selects a first music piece (Step S710). The music piece order determiner 14 may select the first music piece randomly or in response to a user's instruction. Here, it is assumed that the music piece D is selected as the first music piece.

Next, the music piece order determiner 14 selects a music piece having a maximum correlation value with respect to the music piece selected previously (Step S720). In a case where the first music piece is the music piece D, the music piece order determiner 14 selects, as a next music piece, the music piece E having a maximum correlation value of 0.39 with respect to the music piece D.

Next, the music piece order determiner 14 determines whether or not the number of music pieces selected up to now has reached the maximum number of music pieces (Step S730). If the number of music pieces selected up to now has reached the maximum number of music pieces ("Yes" in Step S730), then the music piece order determiner 14 ends the music piece order determination processing. Here, the maximum number of music pieces is the number of music pieces for which the music piece order is to be determined. In an event of determining a music piece order of five music pieces, the maximum number of music pieces is five.

If the number of music pieces selected up to now has not reached the maximum number of music pieces ("No" in Step S730), then the music piece order determiner 14 returns to Step S720, and selects the music piece one more time.

Note that, since the music piece E is selected as a second music piece, the music piece A having a maximum correlation value of 0.40 with respect to the music piece E is selected as a third music piece. With regard to a fourth music piece, since the music piece E having a maximum correlation value of 0.37 with respect to the music piece A and the music piece D having a second maximum correlation value of 0.28 with respect thereto are already selected, the music piece B having a subsequent third maximum correlation value of 0.23 with respect thereto is selected as the fourth music piece. Then, the music piece C that remains becomes a final fifth music piece.

By a series of the processing in the flowchart of FIG. 7, which is as described above, the music piece order determiner 14 selects the first music piece, and with regard to the second music piece and after, sequentially selects the music pieces, each of which has the maximum correlation value with respect to the previous music piece, so as not to repeatedly select the same music pieces until the number of selected music pieces reaches a predetermined number (maximum number of music pieces), and thereby selects the music piece order. In this way, though the product or sum of the correlation values does not necessarily become the maximum value strictly, a necessary and sufficient music piece transition pattern can be determined as an approximate solution thereof simply at a high speed, and in addition, the same music piece can be prevented from being selected a plurality of times.

Such a problem of obtaining the music piece transition pattern in which the product or sum of the correlation values becomes the maximum value can be said to be a so-called combination optimization problem. Besides such a local search method as described above, heuristic algorithm such as a genetic algorithm is used, whereby the approximate solution can be obtained within a finite time. As described above, the method for obtaining the music piece transition pattern in which the product or sum of the correlation values becomes the maximum value or the approximate solution thereof is not limited to the above-mentioned method, and a variety of know methods can be used.

Note that, in this embodiment, the description has been made of the case where the value, which indicates the degree of correlation between the beat position information on the ending portion of one music piece and the beat position information on the beginning portion of the other music piece, is defined as the correlation value between the music pieces; however, the correlation value is not limited to this. A value, which indicates a degree of correlation between at least parts of the beat position information of the respective music pieces between the respective music pieces, just needs to be defined as the correlation value.

For example, a value, which indicates a degree of correlation between pieces of the beat position information of the whole of the music pieces between the respective music pieces, just needs to be defined as the correction value. In this case, the correlation values become the same value no matter which music piece may be the previous music piece between two music pieces.

As described above, the music piece order determination device 10 determines the music piece order based on the correlation values of the beat position information of the respective music pieces in which the BPMs are unified, and can thereby determine the music piece order suitable for the mix reproduction.

Moreover, the value, which indicates the degree of correlation between the pieces of the beat position information on the ending portion and beginning portion of the music pieces between the music pieces, is used as the correlation value, whereby a feeling of wrongness in a connected portion of the music pieces can be effectively reduced. In this way, the music piece order suitable for the mix reproduction can be determined even in a case where compatibility between the ending portion of the previous music piece and the beginning portion of the subsequent music piece does not agree with a degree of similarity between the music pieces, for example, in such a case where the whole of the music piece is rhythmic though the beginning portion of the music piece has a feeling of tranquility.

Note that, though the description has been made on the assumption that one reference BPM is provided in this embodiment, a plurality of the reference BPMs may be provided. In an event of performing the mix reproduction for two music pieces, the BPM of the subsequent music piece is sometimes made to be 1/n (n=1, 2 . . . ) of the BPM of the previous music piece or made to be n times the BPM of the previous music piece.

For example, a case is included, where, when, a music piece with a BPM of 70 is subjected to the mix reproduction after a music piece with a BPM of 120, the BPM of the subsequent music piece is set at 60 as a half of the BPM of the previous music piece, and then the subsequent music piece is reproduced. Also in consideration of such a case, besides the reference BPM serving as a reference, the beat information corrector 12 may also use at least either of a value of 1/n of the reference BPM and a value of n times the reference value concerned as a reference BPM.

In a case of setting a plurality of the reference BPMs as described above, then for each of the music pieces, the beat information corrector 12 generates beat position information in which beat positions are corrected individually in response to the plurality of reference BPMs. In a case where the beat information corrector 12 defines that the plurality of reference BPMs is provided, then between the respective music pieces, the correlation value calculator 13 calculates a correlation value between beat position information in which BPMs are corrected to the same reference BPM, and a correlation value between beat position information in which BPMs are corrected to reference BPMs different from each other. The music piece order determiner 14 determines the music piece order by using these correlation values.

Second Embodiment

The music pieces include those, each of which includes a plurality of types of beats. For example, there is a music piece including: a beat of a bass drum (that is, a bass drum beat) that is a low-range beat; and a beat of a snare drum (that is, a snare drum beat) that is a mid-and-high range beat.

Here, in a case where each of the music pieces A and B includes the above-described two types of beats, then there occurs a case where, between these two music pieces, snare drum beats thereof match with each other though bass drum beats thereof do not match with each other. In such a case, there is a method for performing the mix reproduction for the music pieces A and B while cutting a low-range component of either one thereof.

Moreover, between two music pieces which are the music pieces A and B, there is a case where the bass drum beat of the music piece A and the snare drum beat of the music piece B matches with each other though the bass drum beats do not match with each other and the snare drum beats do not match with each other. In such a case, there is a method for performing the mix reproduction while cutting mid-and-high-range components (or low-range components) of the music piece A and a low-range component (or a mid-and-high-range component) of the music piece B individually by filters and the like.

In a second embodiment, a music piece order determination device is provided, which is capable of realizing such a variety of mix reproductions as described above.

Figure 8:
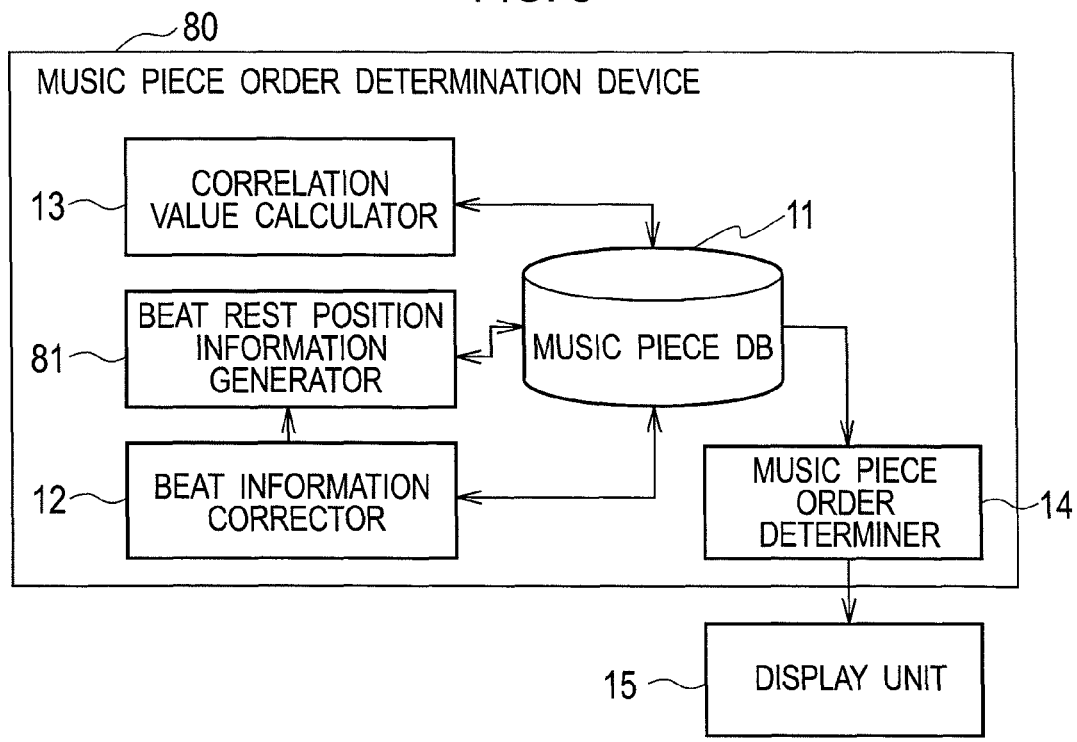
FIG. 8 is a block diagram showing a configuration of a music piece order determination device according to a second embodiment.

FIG. 8 is a block diagram showing a configuration of a music piece order determination device according to the second embodiment. As shown in FIG. 8, the music piece order determination device 80 according to the second embodiment has a configuration in which a beat rest position information generator 81 is added to the music piece order determination device 10 according to the first embodiment, which is shown in FIG. 1.

In a case where the music piece added to the music piece DB 11 does not hold beat rest position information, the beat rest position information generator 81 generates the beat rest position information of the music piece concerned.

Figure 9A:
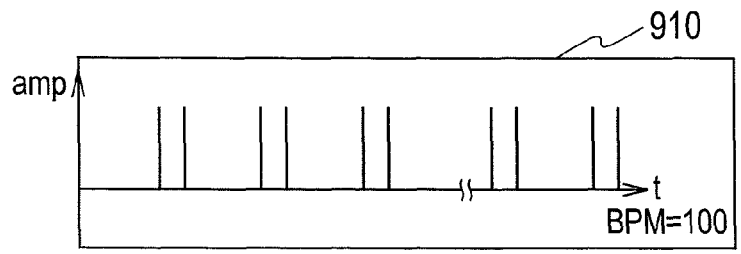
FIG. 9A is a diagram showing beat rest position information.
Figure 9B:
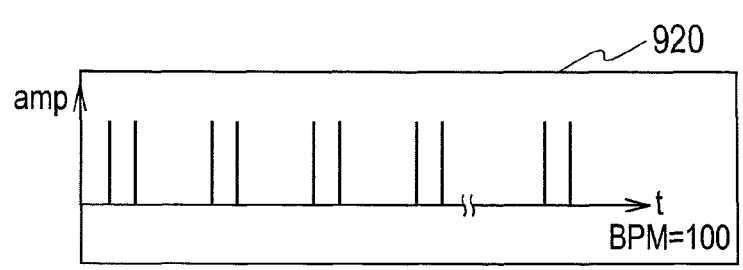
FIG. 9B is a diagram showing beat position information.
Figure 9C:
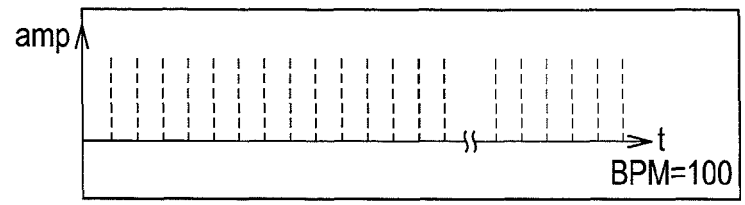
FIG. 9C is a diagram showing positions of beats.

FIG. 9A is a diagram showing the beat rest position information, FIG. 9B is diagram showing beat position information, and FIG. 9C is a diagram showing positions of all of the beats.

As shown in FIG. 9A, the beat rest position information 910 has a similar format to that of the beat position information 920 shown in FIG. 9B. The beat rest position information 910 of FIG. 9A is generated by excluding beat positions in the beat position information 920 in FIG. 9B from all of the beat positions shown by broken lines in FIG. 9C. Note that, though quarter notes are used as the beat positions in FIGS. 9A to 9C, eighth notes, semiquaver notes and the like may be used in accordance with granularity of the original beats.

Note that a generation method of the beat rest position information is not limited to the above-mentioned method, and the user may input positions of the rests (that is, points of time of beats which are not reproduced) in advance, or positions of the beats which are not detected among all of the beats may be automatically generated as the positions of the rests.

Here, there are classified beat rest information and full beat rest position information as the beat rest position information to be handled in the music piece order determination device 80.

The classified beat rest position information is beat rest position information for each of the beat types such as a bass drum beat and a snare drum beat. The classified beat rest position information includes information regarding a point of time of a beat when the beat of the beat type corresponding thereto is not reproduced.

For example, the classified beat rest position information corresponding to the bass drum beat includes information regarding a point of time of a beat when the bass drumbeat is not reproduced. Note that an instrument that forms the beat is not limited to a percussion instrument, and may be an instrument such as a piano, which has a scale, in a case of a playing style that beats out rhythm. Moreover, the beat type does not necessarily have to be classified for each of the instruments. For example, the beat type may be classified for each of the frequency bands, and a hi-hat cymbal and a ride cymbal may be handled in a lump with the high frequency band.

The full beat rest position information includes information regarding a point of time of a beat when any type of the beat is not reproduced.

Moreover, in the music piece order determination device 80, classified beat position information and full beat position information are held as the beat position information.

The classified beat position information is beat position information for each of the beat types. The classified beat position information includes information regarding a point of time when the beat for each of the beat types is reproduced.

The full beat position information includes information regarding a point of time when at least any type of the beat is reproduced.

The classified beat position information, the full beat position information, the classified beat rest position information, and the full beat rest position information, which are mentioned above, are included in the beat information metadata stored by the music piece DB 11. That is to say, in the music piece order determination device 80, the beat information metadata stored by the music piece DB 11 includes the classified beat position information, the full beat position information, the classified beat rest position information, the full beat rest position information, and the tempo value (BPM).

As shown in FIGS. 9A and 9B, the beat rest position information (classified beat rest position information, full beat rest position information) has a similar data format to that of the beat position information (classified beat position information, full beat position information). Therefore, for example, it is possible to calculate a correlation value between the classified beat rest position information and the classified beat position information.

The beat information corrector 12 corrects positions of beats in the classified beat position information and full beat position information of the music piece in which the BPM is different from the reference BPM, and in addition, corrects positions of rests in the classified beat rest position information and the full beat rest position information. In this way, the beat information corrector 12 allows the BPMs of the respective music pieces to coincide with the reference BPM (unifies the BPMs).

The correlation value calculator 13 calculates the correlation values between the respective music pieces among the plurality of music pieces based on the classified beat position information, the full beat position information, the classified beat rest position information, and the full beat rest position information, in which the BPMs are unified. Moreover, the correlation value calculator 13 generates a correlation value table, and stores the generated correlation value table in the music piece DB 11.

Next, a description is made of operations of the music piece order determination device 80.

Figure 10:
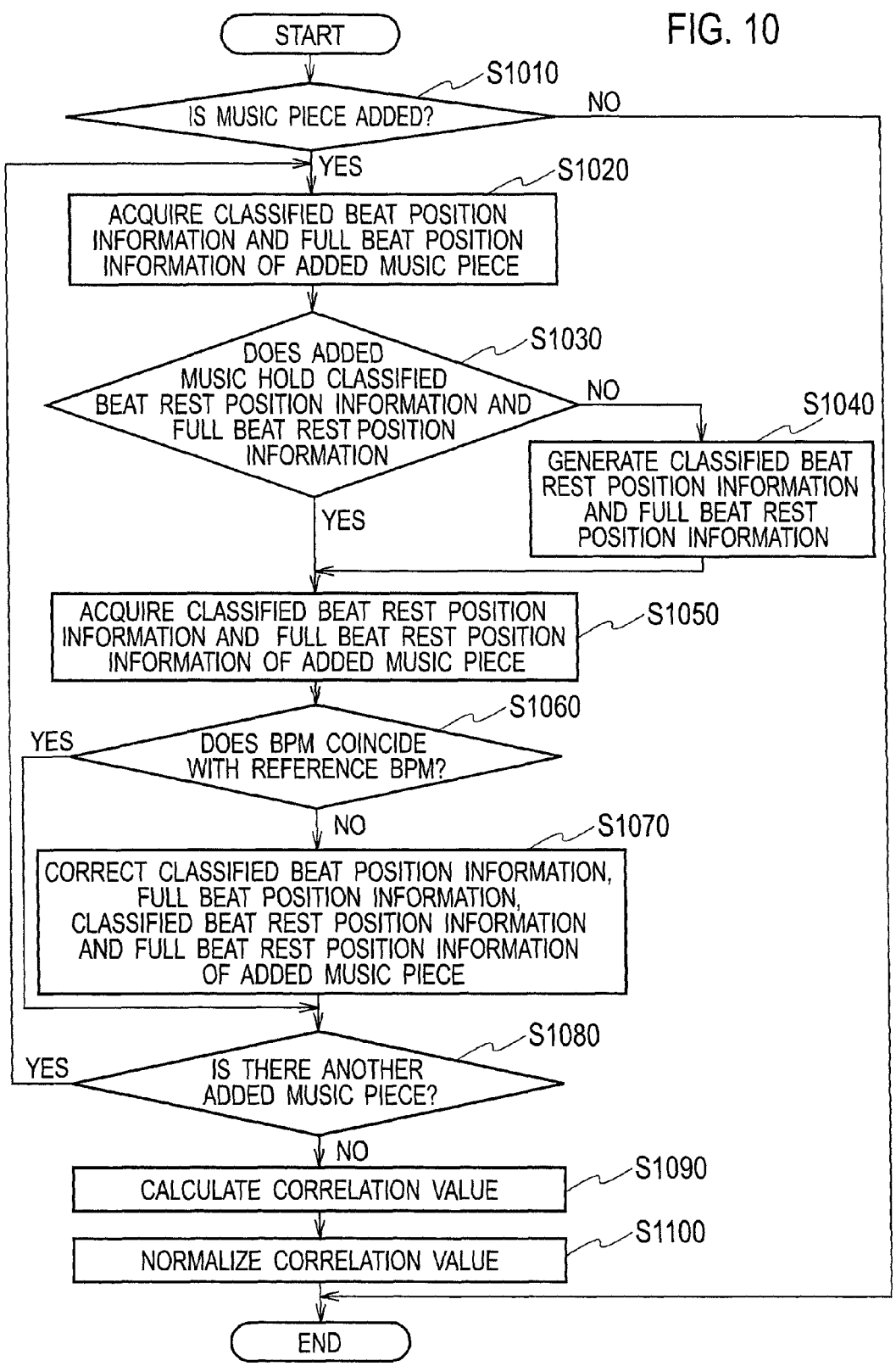
FIG. 10 is a flowchart for explaining operations of the music piece order determination device according to the second embodiment at a time of adding a music piece to a music piece DB.

Every time when the music piece is added to the music piece DB 11, the music piece order determination device 80 calculates the correlation value, and so on. FIG. 10 is a flowchart for explaining operations of the music piece order determination device 80 at the time of adding the music piece to the music piece DB 11.

First, as shown in FIG. 10, the beat information corrector 12 determines whether or not the music piece is newly added to the music piece DB 11 (Step S1010), and ends the processing if the music piece is not newly added ("NO" in Step S1010).

In a case where a new music piece is added to the music piece DB 11 ("Yes" in Step S1010), the beat information corrector 12 acquires classified beat position information, full beat position information and BPM of the added music piece from the music piece DB 11 (Step S1020).

Next, the beat information corrector 12 determines whether or not the added music piece holds the classified beat rest position information and the full beat rest position information (Step S1030). In a case where the added music piece holds the classified beat rest position information and the full beat rest position information ("Yes" in Step S1030), then a procedure of the operations proceeds to Step S1050).

In a case where the added music piece does not hold the classified beat rest position information and the full beat rest position information ("No" in Step S1030), the beat information corrector 12 allows the beat rest position information generator 81 to generate the classified beat rest position information and full beat rest position information of the added music piece (Step S1040).

The beat rest position information generator 81 generates the classified beat rest position information and the full beat rest position information in such a manner described by using FIGS. 9A to 9C mentioned above. The beat rest position information generator 81 stores the generated classified beat rest position information and full beat rest position information as beat information metadata of the added music piece in the music piece DB 11. Thereafter, the procedure proceeds to Step S1050.

In Step S1050, the beat information corrector 12 acquires the classified beat rest position information and full beat rest position information of the added music piece from the music piece DB 11.

Next, the beat information corrector 12 determines whether or not the BPM of the added music piece coincides with the reference BPM (Step S1060). In a case where the BPM of the added music piece coincides with the reference BPM ("Yes" in Step S1060), the procedure proceeds to Step S1080.

In a case where the BPM of the added music piece does not coincide with the reference BPM ("No" in Step S1060), the beat information corrector 12 corrects positions of beats in the classified beat position information and full beat position information of the added music piece, in addition, corrects positions of rests in the classified beat position information and full beat position information thereof, and allows the BPM of the music piece concerned to coincide with the reference BPM (Step S1070). Thereafter, the procedure proceeds to Step S1080.

Here, the correction of such beat positions in the classified beat position information and the full beat position information is performed using the method described in FIGS. 4A and 4B in the first embodiment. Correction of such rest positions in the classified beat position information and the full beat position information is also performed in a similar way.

In Step S1080, the beat information corrector 12 determines whether or not there is another added music piece. In a case where the beat information corrector 12 determines that there is another added music piece ("Yes" in Step S1080), the procedure returns to the processing of Step S1020. In a case where the beat information corrector 12 determines that there is no other added music piece ("No" in Step S1080), the procedure proceeds to processing of S1090 that follows.

In Step S1090, the correlation value calculator 13 calculates correlation values between the added music piece and music pieces other than the same.

Specifically, the correlation value calculator 13 calculates correlation values, each of which indicates a degree of mutual correlation in a combination of one piece of information selected from the classified beat position information, the full beat position information, the classified beat rest position information and the full beat position information on an ending portion of the added music piece and of one piece of information selected from the classified beat position information, the full beat position information, the classified beat rest position information and the full beat rest position information on each of beginning portions of the music pieces other than the same, for all of the combinations.

In this way, the correlation value calculator 13 calculates correlation values in a case where the added music piece is the previous music piece and the music pieces other than the same are the subsequent music pieces. The correlation value calculator 13 stores the calculated correlation values as the beat information metadata of the added music piece in the music piece DB 11.

Moreover, the correlation value calculator 13 calculates correlation values, each of which indicates a degree of mutual correlation in a combination of one piece of information selected from the classified beat position information, the full beat position information, the classified beat rest position information and the full beat position information on a beginning portion of the added music piece and of one piece of information selected from the classified beat position information, the full beat position information, the classified beat rest position information and the full beat rest position information on each of ending portions of the music pieces other than the same, for all of the combinations.

In this way, the correlation value calculator 13 calculates correlation values in a case where the music pieces other than the added music piece are the previous music pieces and the added music piece is the subsequent music piece. The correlation value calculator 13 stores the calculated correlation values as the beat information metadata of the music pieces other than the added music piece in the music piece DB 11.

Here, in a case where the beat types are two types, which are the bass drum beat and the snare drum beat, the combination of one piece of the information selected from the classified beat position information, full beat position information, classified beat rest position information and full beat position information of the added music piece and of one piece of the information selected from the classified beat position information, full beat position information, classified beat rest position information and full beat rest position information of the music pieces other than the same has 36 ways which are combinations K1 to K36 shown in FIG. 11.

In this case, for each of the combinations K1 to K36, the correlation value calculator 13 calculates a degree of mutual correlation in a combination between one piece of information selected from the classified beat position information of the bass drum beat on the ending portion of the added music and of one piece of information selected from the classified beat position information and the like of the bass drum beat on each of the beginning portions of the music pieces other than the same.

Moreover, for each of the combinations K1 to K36, the correlation value calculator 13 calculates a degree of mutual correlation in a combination between one piece of information selected from the classified beat position information of the bass drum beat on the beginning portion of the added music and of one piece of information selected from the classified beat position information and the like of the bass drum beat on each of the ending portions of the music pieces other than the same.

In FIG. 11, "bass drum beat" indicates the classified beat position information of the bass drum beat, "snare drum beat" indicates the classified beat position information of the snare drum beat, and "full beat" indicates the full beat position information. Moreover, "bass drum rest" indicates the classified beat rest position information of the bass drum beat, "snare drum rest" indicates the classified beat rest position information of the snare drum beat, and "full rest" indicates the full beat rest position information. Moreover, "stored music piece" indicates the music piece other than the added music piece.

Note that the correlation values do not have to be necessarily calculated for all of the combinations, and a part thereof may be omitted.

A calculation method of the correlation value in Step S1090 is similar to the method described by using FIG. 6 in the first embodiment.

Then, in Step S1100, the correlation value calculator 13 normalizes the correlation values, and stores the normalized correlation values as a correlation value table in the music piece DB 11. Here, for example, in the case where the number of beat types is two, which are the bass drum beat and the snare drum beat, the correlation value calculator 13 generates a correlation value table corresponding individually to the combinations K1 to K36 in FIG. 11. The normalization is similar to that of the first embodiment, and accordingly, a description thereof is omitted.

For example, a correlation value table 1200 shown in FIG. 12 shows correlation values between the bass drum beats, and corresponds to the combination K1 of FIG. 11. Moreover, a correlation value table 1300 shown in FIG. 13 shows correlation values between the snare drum beats, and corresponds to the combination K8 of FIG. 11. Here, some music pieces do not have the bass drum beats or the snare drum beats.

In the examples of FIG. 12 and FIG. 13, the music piece B does not have the bass drum beat, and accordingly, the music piece B is not included in the correlation value table 1200 of FIG. 12. Moreover, the music piece D does not have the snare drum beat, and accordingly, the music piece D is not included in the correlation value table 1300 of FIG. 13.

Note that, in the second embodiment, the correlation value table is present for each of the combinations of the information (classified beat position information, full beat position information, classified beat rest position information, full beat rest position information) regarding the beats and the rests, and accordingly, the correlation value calculator 13 may generate a correlation value table in which the correlation values are summarized for each of the music pieces.

Figure 14:
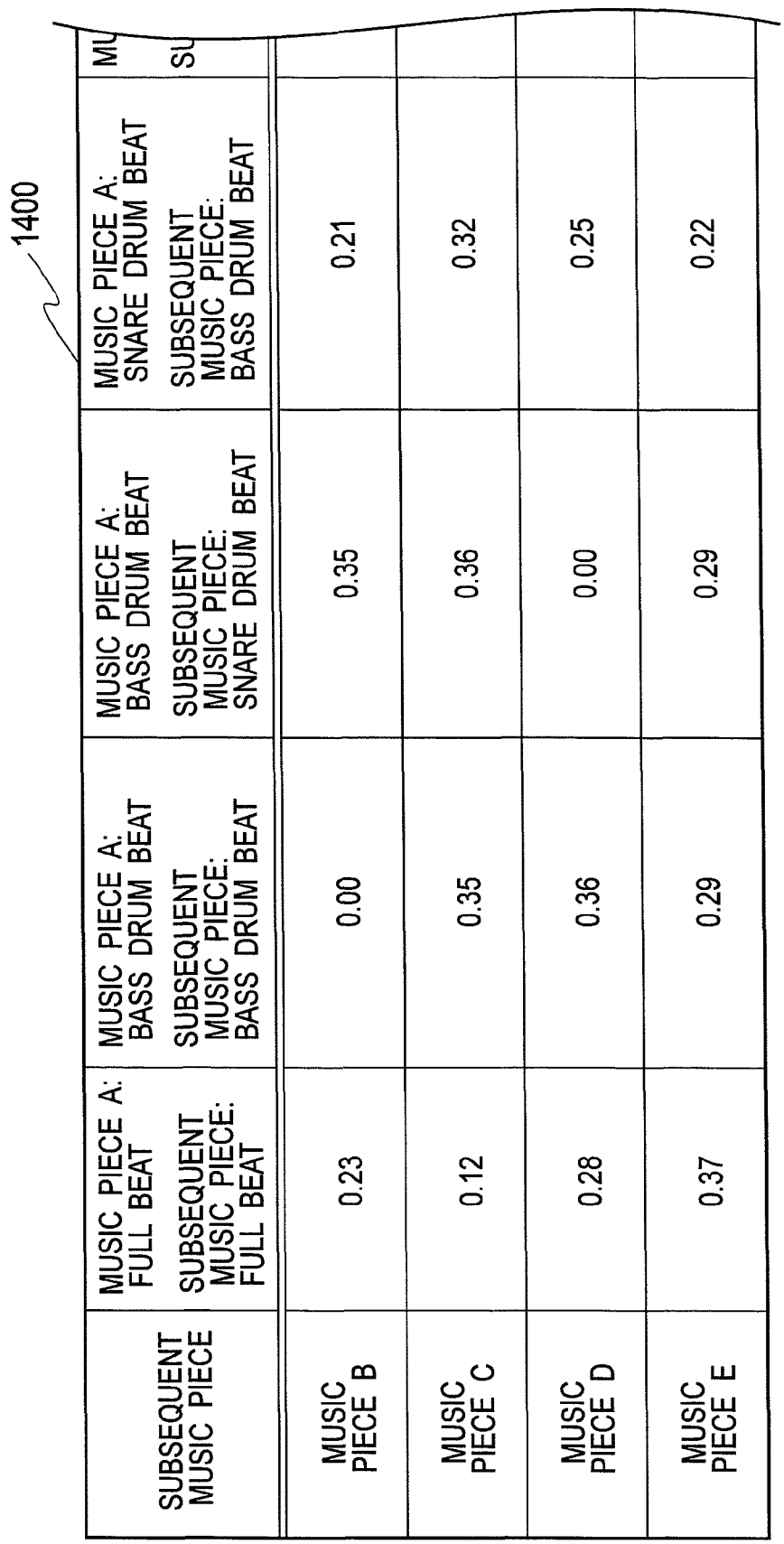
FIG. 14 is a table showing an example of a correlation value table for each of the music pieces.

For example, the correlation value calculator 13 may generate such a correlation value table as shown in FIG. 14 for each of the music pieces, and may store the generated correlation value table in the music piece DB 11. The correlation value table 1400 shown in FIG. 14 is a correlation value table that stores correlation values for each of the combinations of the information regarding the beats and the rests between the subsequent music pieces (music pieces B to E) in a case where the music piece A is the previous music piece.

Next, a description is made of the music piece order determination processing in the music piece order determination device 80.

In a similar way to the first embodiment, the music piece order determiner 14 determines a music piece order of a predetermined number of the music pieces, which are to be reproduced from the music piece DB 11, so that the product or total sum of the correlation values between the music pieces to be successively reproduced, can become the maximum value. For example, the music piece order determiner 14 selects the predetermined number of music pieces from the music piece DB 11 randomly or according to user's designation.

The music piece order determiner 14 determines such a music piece order that the product or total sum of the correlation values between the music pieces to be successively reproduced can become the maximum value among the selected music pieces. In this event, the music piece order determiner 14 selects, as the correlation values between the music pieces, a maximum correlation value among the respective correlation values corresponding to the respective combinations of the information regarding the beats and the rests.

Moreover, the music piece order determiner 14 may determine the music piece order by music piece order determination processing similar to that in the flowchart of FIG. 7, which is described in the first embodiment.

In this event, first, the music piece order determiner 14 selects the first music piece. Thereafter, with regard to the second music piece and after, the music piece order determiner 14 sequentially selects, as the subsequent music pieces, the music pieces, each of which has the maximum correlation value with respect to the previous music piece, so as not to repeatedly select the same music pieces.

In this event, it is recommended that the music piece order determiner 14 use such a correlation value table for each of the music pieces, as the correlation value table 1400 of FIG. 14. For example, in a case where the music piece A is selected as the first music piece, the music piece order determiner 14 selects, as the second music piece, a music piece having the maximum correlation value among all of the correlation values shown in the correlation value table 1400 of FIG. 14.

Note that, in a case where the music piece order is determined, the music piece order determiner 14 may determine appropriate effect processing and the like for leaving a band of the necessary beat type and cutting a band of the unnecessary beat type based on the combination of the pieces of the information regarding the beats and the rests, which correspond to the correlation values adopted in the event of determining the successive music pieces, and then add the determined effect processing and the like to the music piece information.

As described above, the music piece order determination device 80 holds the classified beat position information, the full beat position information, the classified beat rest position information, and the full beat rest position information, and determines the music piece order based on the correlation values calculating by using these. In this way, the music piece order determination device 80 can determine the music piece order, which is suitable for the mix reproduction, and further, is capable of realizing the variety of mix reproductions.

Note that, in the second embodiment, the description has been made of the case of calculating each of the correlation values from any of the classified beat position information, the full beat position information, the classified beat rest position information and the full beat rest position information on the ending portion of one music piece and from any of the classified beat position information, the full beat position information, the classified beat rest position information and the full beat rest position information on the beginning portion of the other music piece; however, the correlation value is not limited to this.

The correlation value just needs to be calculated based on classified beat position information, full beat position information, classified beat rest position information and full beat rest position information on at least a part of the one music piece and on classified beat position information, full beat position information, classified beat rest position information and full beat rest position information on at least a part of the other music piece.

Moreover, also in the second embodiment, besides the reference BPM serving as a base, at least either of the value of 1/n thereof and the value n times the same reference BPM may also be used as the reference BPM in a similar way to the first embodiment.

In the case of setting the plurality of reference BPMs as described above, then for each of the music pieces, the beat information corrector 12 generates classified beat position information, full beat position information, classified beat rest position information and full beat rest position information, in which the beat positions and the rest positions are corrected in response to each of the plurality of reference BPMs.

For example, it is assumed that the reference BPM includes: a first reference BPM serving as the base; a second reference BPM having the value n times the first reference BPM; and a third reference BPM having the value 1/n times the first reference BPM.

In this case, the beat information corrector 12 generates classified beat position information, full beat position information, classified beat rest position information and full beat rest position information, in which the beat positions and the rest positions are corrected so that the BPMs can have the same values as those of the respective first to third reference BPMs for each of the music pieces.

The correlation value calculator 13 calculates the correlation values, each of which indicates a degree of mutual correlation in a combination of one piece of information selected from the classified beat position information, the full beat position information, the classified beat rest position information and the full beat position information, in which the BPMs are corrected to the same values as those of the first to third reference BPMs on one music piece between the respective music pieces, and of one piece of information selected from the classified beat position information, the full beat position information, the classified beat rest position information and the full beat position information, in which the BPMs are corrected to the same values as those of the first to third reference BPMs on the other music piece therebetween, for all of the combinations.

The music piece order determiner 14 determines the music piece order by using these correlation values. Note that the correlation values do not have to be necessarily calculated for all of the combinations.

Note that the number of reference BPMs is not limited to three. For example, a reference BPM that is (n+1) times the first reference BPM and a reference BPM that is 1/(n+1) times the first reference BPM may be used.

In a case of setting the plurality of reference BPMs, all of the plurality of reference BPMs do not necessarily have to be used. For example, there can also be used such a method matching the BPM of the music piece only with a reference BPM in which a difference from the BPM of the music piece is smallest among the plurality of reference BPMs, such a method of matching the BPM of the music piece only with a reference BPM in which a difference from the BPM of the music piece is a predetermined distance thereamong, and the like.

In the music piece order determination device 80, the holding of the classified beat rest position information and the full beat rest position information may be omitted. In this case, the music piece order determination device 80 holds the classified beat position information and the full beat position information, and determines the music piece order based on correlation values calculated by using these.

In the music piece order determination device 80, in addition to that the holding of the classified beat rest position information and the full beat rest position information is omitted, the calculation of the correlation values between the pieces of the classified beat position information different in the beat type and of the correlation values between the classified beat position information and the full beat position information may be omitted.

In this case, the correlation value calculator 13 calculates a correlation value (first correlation value), which indicates a degree of correlation in the classified beat position information for each of the beat types between the respective music pieces among the plurality of music pieces, and a correlation value (second correlation value), which indicates a degree of mutual correlation in the full beat position information therebetween. The music piece order determiner 14 determines the music piece order by using these correlation values.

In this case, it is assumed that the reference BPM includes the first to third reference BPMs mentioned above. In this case, between the respective music pieces, the correlation value calculator 13 calculates: correlation values, each of which indicates a degree of correlation between the pieces of the classified beat position information in which the BPMs are corrected to the same reference BPM; correlation values, each of which indicates a degree of correlation between the pieces of the classified beat position information in which the BPMs are corrected to reference BPMs different from each other; correlation values, each of which indicates a degree of correlation between the pieces of the full beat position information in which the BPMs are corrected to the same reference BPM; and correlation values, each of which indicates a degree of correlation between the pieces of the full beat position information in which the BPMs are corrected to reference BPMs different from each other. The music piece order determiner 14 determines the music piece order by using these correlation values.

The music piece order determination devices 10 and 80 of the first and second embodiments can be configured so as to realize functions thereof in such a manner that CPUs execute a music piece order determination program. The music piece order determination program may be stored in a recording medium readable by a computer, and may be read from the recording medium and taken into the devices, or may be transferred through a communication network or the like and may be taken into the devices.

The recording medium may be a non-transitory computer readable medium. The music piece order determination program may be a computer program product stored in the non-transitory computer readable medium.

As described above, in accordance with the first and second embodiments, the music piece order suitable for the mix reproduction can be determined. The first and second embodiments can be used in the case of determining the reproduction order of the plurality of music pieces, for example, in the event of the mix reproduction as one of the music expression methods.

What is claimed is:

1. A music piece order determination device comprising:
a beat information corrector configured, in a case of reproducing a music piece, to acquire beat position information including at least information regarding a point of time when a beat is reproduced, to acquire a tempo value indicating a number of beats per unit time in the music piece, and to correct, in a case where the tempo value is different from a reference value, the beat position information of the music piece so that the tempo value of the music piece be a same value as the reference value;
a correlation value calculator configured to calculate a correlation value based on the beat position information in which the tempo value is corrected to the same value as the reference value, the correlation value indicating a degree of correlation of beat position information between respective music pieces among a plurality of the music pieces; and
a music piece order determiner configured to determine a music piece order as a reproduction order of music pieces, the music pieces being reproduced successively, so that a product or total sum of the correlation values between the music pieces be at a maximum or an approximate solution thereof.

2. The music piece order determination device according to claim 1,
wherein the beat information corrector acquires classified beat position information including, as the beat information, information regarding a point of time when the beat is reproduced for each of beat types, and acquires information regarding a point of time when a beat of at least any of the types is reproduced, and
the correction value calculator calculates, between the respective music pieces among the plurality of music pieces, a correlation value indicating a degree of correlation of the classified beat position information for each of the beat types and a correlation value indicating a degree of correlation of the full beat position information based on the classified beat position information and the full beat position information, in each of which the tempo value is corrected to the same value as the reference value.

3. The music piece order determination device according to claim 2,
wherein the reference value includes a first reference value, and a second reference value as a value n times the first reference value, and
between the respective music pieces among the plurality of music pieces, the correlation value calculator calculates: a correlation value indicating a degree of correlation between pieces of the classified beat position information, in which the tempo values are corrected to the same reference value; a correction value indicating a degree of correlation between pieces of the classified beat position information, in which the tempo values are corrected to reference values different from each other; a correlation value indicating a degree of correlation between pieces of the full beat position information, in which the tempo values are corrected to the same reference value; and a correction value indicating a degree of correlation between pieces of the full beat position information, in which the tempo values are corrected to reference values different from each other.

4. The music piece order determination device according to claim 2,
wherein the reference value includes a first reference value, and a third reference value as a value 1/n times the first reference value, and
between the respective music pieces among the plurality of music pieces, the correlation value calculator calculates: a correlation value indicating a degree of correlation between pieces of the classified beat position information, in which the tempo values are corrected to the same reference value; a correction value indicating a degree of correlation between pieces of the classified beat position information, in which the tempo values are corrected to reference values different from each other; a correlation value indicating a degree of correlation between pieces of the full beat position information, in which the tempo values are corrected to the same reference value; and a correction value indicating a degree of correlation between pieces of the full beat position information, in which the tempo values are corrected to reference values different from each other.

5. The music piece order determination device according to claim 2,
wherein the reference value includes a first reference value, a second reference value as a value n times the first reference value, and a third reference value as a value 1/n times the first reference value, and between the respective music pieces among the plurality of music pieces, the correlation value calculator calculates: a correlation value indicating a degree of correlation between pieces of the classified beat position information, in which the tempo values are corrected to the same reference value; a correction value indicating a degree of correlation between pieces of the classified beat position information, in which the tempo values are corrected to reference values different from each other; a correlation value indicating a degree of correlation between pieces of the full beat position information, in which the tempo values are corrected to the same reference value; and a correction value indicating a degree of correlation between pieces of the full beat position information, in which the tempo values are corrected to reference values different from each other.

6. The music piece order determination device according to claim 2, wherein, between the respective music pieces, the correlation value calculator calculates the correlation value from the classified beat position information or the full beat position information on an ending portion of one of the music pieces, and from the classified beat position information or the full beat position information on a beginning portion of another of the music pieces, the classified beat position information or the full beat position information corresponding to the one of the music pieces.

7. The music piece order determination device according to claim 2, wherein, between the respective music pieces among the plurality of music pieces, the correlation value calculator calculates a correlation value, which indicates a degree of mutual correlation in a combination of one piece of information selected from various pieces of classified beat position information and full beat position information of one of the music pieces, and of one piece of information selected from various pieces of classified beat position information and full beat position information of another of the music pieces, for at least one combination based on the pieces of the classified beat position information and the pieces of the full beat position information, in which the tempo values are corrected to the same value as the reference value.

8. The music piece order determination device according to claim 7, wherein the reference value includes a first reference value, and a second reference value as a value n times the first reference value, and between the respective music pieces among the plurality of music pieces, the correlation value calculator calculates a correlation value, which indicates a degree of mutual correlation in a combination of one piece of information selected from various pieces of the classified beat position information and the full beat position information, in which the tempo values are corrected individually to the same values as the first and second reference values, the classified beat position information and the full beat position information belonging to one of the music pieces, and of one piece of information selected from various pieces of the classified beat position information and the full beat position information, in which the tempo values are corrected individually to the same values as the first and second reference values, the classified beat position information and the full beat position information belonging to another of the music pieces, for at least one combination.

9. The music piece order determination device according to claim 7, wherein the reference value includes a first reference value, and a third reference value as a value 1/n times the first reference value, and between the respective music pieces among the plurality of music pieces, the correlation value calculator calculates a correlation value, which indicates a degree of mutual correlation in a combination of one piece of information selected from various pieces of the classified beat position information and the full beat position information, in which the tempo values are corrected individually to the same values as the first and third reference values, the classified beat position information and the full beat position information belonging to one of the music pieces, and of one piece of information selected from various pieces of the classified beat position information and the full beat position information, in which the tempo values are corrected individually to the same values as the first and third reference values, the classified beat position information and the full beat position information belonging to another of the music pieces, for at least one combination.

10. The music piece order determination device according to claim 7, wherein the reference value includes a first reference value, a second reference value as a value n times the first reference value, and a third reference value as a value 1/n times the first reference value, and between the respective music pieces among the plurality of music pieces, the correlation value calculator calculates a correlation value, which indicates a degree of mutual correlation in a combination of one piece of information selected from various pieces of the classified beat position information and the full beat position information, in which the tempo values are corrected individually to the same values as the first to third reference values, the classified beat position information and the full beat position information belonging to one of the music pieces, and of one piece of information selected from various pieces of the classified beat position information and the full beat position information, in which the tempo values are corrected individually to the same values as the first to third reference values, the classified beat position information and the full beat position information belonging to another of the music pieces, for at least one combination.

11. The music piece order determination device according to claim 7, wherein, between the respective music pieces, the correlation value calculator calculates the correlation value from the classified beat position information or the full beat position information on an ending portion of one of the music pieces, and from the classified beat position information or the full beat position information on a beginning portion of another of the music pieces.

12. The music piece order determination device according to claim 2, wherein the beat information corrector further acquires classified beat rest position information including information regarding a point of time when the beat is not reproduced for each of the beat types, acquires full beat rest position information including information regarding a point of time when any type of the beat is not reproduced, and in a case where the tempo value is different from the reference value, corrects the classified beat position information, full beat position information, classified beat rest position information and full beat rest position information of the music piece so that the tempo value becomes the same value as the reference value, and between the respective music pieces among the plurality of music pieces, the correlation value calculator calculates a correlation value, which indicates a degree of mutual correlation in a combination of one piece of information selected from various pieces of classified beat position information, full beat position information, variety of classified beat rest position information and full beat rest position information of one of the music pieces, and of one piece of information selected from various pieces of classified beat position information, full beat position information, variety of classified beat rest position information and full beat rest position information of another of the music pieces, for at least one combination based on the pieces of the classified beat position information, the pieces of the full beat position information, the pieces of the classified beat rest position information and the pieces of the full beat rest position information, in which the tempo values are corrected to the same value as the reference value.

13. The music piece order determination device according to claim 12, wherein the reference value includes a first reference value, and a second reference value as a value n times the first reference value, and between the respective music pieces among the plurality of music pieces, the correlation value calculator calculates a correlation value, which indicates a degree of mutual correlation in a combination of one piece of information selected from various pieces of the classified beat position information, the full beat position information, the classified beat rest position information and the full beat rest position information, in which the tempo values are corrected individually to the same values as the first and second reference values, the classified beat position information, the full beat position information, the classified beat rest position information and the full beat rest position information belonging to one of the music pieces, and of one piece of information selected from various pieces of the classified beat position information, the full beat position information, the classified beat rest position information and the full beat rest position information, in which the tempo values are corrected individually to the same values as the first and second reference values, the classified beat position information, the full beat position information, the classified beat rest position information and the full beat rest position information belonging to another of the music pieces, for at least one combination.

14. The music piece order determination device according to claim 12, wherein the reference value includes a first reference value, and a third reference value as a value 1/n times the first reference value, and between the respective music pieces among the plurality of music pieces, the correlation value calculator calculates a correlation value, which indicates a degree of mutual correlation in a combination of one piece of information selected from various pieces of the classified beat position information, the full beat position information, the classified beat rest position information and the full beat rest position information, in which the tempo values are corrected individually to the same values as the first and third reference values, the classified beat position information, the full beat position information, the classified beat rest position information and the full beat rest position information belonging to one of the music pieces, and of one piece of information selected from various pieces of the classified beat position information, the full beat position information, the classified beat rest position information and the full beat rest position information, in which the tempo values are corrected individually to the same values as the first and third reference values, the classified beat position information, the full beat position information, the classified beat rest position information and the full beat rest position information belonging to another of the music pieces, for at least one combination.

15. The music piece order determination device according to claim 12, wherein the reference value includes a first reference value, a second reference value as a value n times the first reference value, and a third reference value as a value 1/n times the first reference value, and between the respective music pieces among the plurality of music pieces, the correlation value calculator calculates a correlation value, which indicates a degree of mutual correlation in a combination of one piece of information selected from various pieces of the classified beat position information, the full beat position information, the classified beat rest position information and the full beat rest position information, in which the tempo values are corrected individually to the same values as the first to third reference values, the classified beat position information, the full beat position information, the classified beat rest position information and the full beat rest position information belonging to one of the music pieces, and of one piece of information selected from various pieces of the classified beat position information, the full beat position information, the classified beat rest position information and the full beat rest position information, in which the tempo values are corrected individually to the same values as the first to third reference values, the classified beat position information, the full beat position information, the classified beat rest position information and the full beat rest position information belonging to another of the music pieces, for at least one combination.

16. The music piece order determination device according to claim 12, wherein, between the music pieces, the correlation value calculator calculates the correlation value from any of the classified beat position information, the full beat position information, the classified beat rest position information and the full beat rest position information on an ending portion of one of the music pieces and from any of the classified beat position information, the full beat position information, the classified beat rest position information and the full beat rest position information on a beginning portion of another of the music pieces.

17. A music piece order determination method comprising the steps of:

acquiring beat position information including at least information regarding a point of time when a beat is reproduced in a case of reproducing a music piece, acquiring a tempo value indicating a number of beats per unit time in the music piece, and correcting, in a case where the tempo value is different from a reference value, the beat position information of the music piece so that the tempo value of the music piece be a same value as the reference value;

calculating a correlation value based on the beat position information in which the tempo value is corrected to the same value as the reference value, the correlation value indicating a degree of correlation of beat position information between respective music pieces among a plurality of the music pieces; and determining a music piece order as a reproduction order of music pieces, the music pieces being reproduced successively, so that a product or total sum of the correlation values between the music pieces be at a maximum or an approximate solution thereof.

18. A computer program product stored in a non-transitory computer readable medium for causing a computer to perform the steps of:

acquiring beat position information including at least information regarding a point of time when a beat is reproduced in a case of reproducing a music piece, acquiring a tempo value indicating a number of beats per unit time in the music piece, and correcting, in a case where the tempo value is different from a reference value, the beat position information of the music piece so that the tempo value of the music piece be a same value as the reference value;

calculating a correlation value based on the beat position information in which the tempo value is corrected to the same value as the reference value, the correlation value indicating a degree of correlation of beat position information between respective music pieces among a plurality of the music pieces; and determining a music piece order as a reproduction order of music pieces, the music pieces being reproduced successively, so that a product or total sum of the correlation values between the music pieces be at a maximum or an approximate solution thereof.

\* \* \* \* \*